United States Patent
Fu et al.

(10) Patent No.: US 12,524,210 B2
(45) Date of Patent: Jan. 13, 2026

(54) HYBRID INFERENCE SYSTEM FOR COGS REDUCTION

(71) Applicant: MICROSOFT TECHNOLOGY LICENSING, LLC., Redmond, WA (US)

(72) Inventors: Shengyu Fu, Redmond, WA (US); Jin Woo Jang, Kirkland, WA (US); Neelakantan Sundaresan, Bellevue, WA (US); Alexey Svyatkovskiy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 18/241,244

(22) Filed: Sep. 1, 2023

(65) Prior Publication Data
US 2024/0385814 A1    Nov. 21, 2024

Related U.S. Application Data

(60) Provisional application No. 63/467,309, filed on May 17, 2023.

(51) Int. Cl.
*G06F 8/35* (2018.01)
*G06F 11/3604* (2025.01)

(52) U.S. Cl.
CPC ............ *G06F 8/35* (2013.01); *G06F 11/3608* (2013.01)

(58) Field of Classification Search
CPC ........................................................ G06F 8/35
See application file for complete search history.

(56) References Cited

U.S. PATENT DOCUMENTS

| | | | | |
|---|---|---|---|---|
| 11,726,750 | B1* | 8/2023 | Arcadinho | G06F 8/33 717/113 |
| 11,954,602 | B1* | 4/2024 | Mulcahy | G06F 40/284 |
| 12,039,295 | B2* | 7/2024 | Allamanis | G06F 8/33 |
| 12,141,553 | B2* | 11/2024 | Athiwaratkun | G06F 11/3684 |
| 12,147,765 | B2* | 11/2024 | Bhardwaj | G06F 40/284 |
| 12,254,008 | B2* | 3/2025 | Zorn | G06F 8/10 |
| 2020/0249918 | A1* | 8/2020 | Svyatkovskiy | G06N 3/084 |
| 2020/0364408 | A1* | 11/2020 | Lao | G06F 16/00 |
| 2021/0271455 | A1* | 9/2021 | Svyatkovskiy | G06F 8/33 |

(Continued)

OTHER PUBLICATIONS

Ciniselli, Matteo, et al. "An empirical study on the usage of transformer models for code completion." IEEE Transactions on Software Engineering 48.12 (2021).*

(Continued)

*Primary Examiner* — Francisco J Aponte
(74) *Attorney, Agent, or Firm* — Workman Nydegger

(57) ABSTRACT

A hybrid inference system for a coding assistant utilizes a routing model to predict whether output generated by a large language model for a given prompt would be accepted by a user of the coding assistant. The routing model routes the prompt when the routing model indicates that the output generated by the large language model is likely to be accepted. The routing model routes the prompt to a local model when the output generated by the large language model is not likely to be accepted. The routing model is trained on the historical output generated by the large language model for various prompts and the acceptance or rejection of the output by users of the coding assistant.

20 Claims, 8 Drawing Sheets

(56) References Cited

U.S. PATENT DOCUMENTS

| | | | | |
|---|---|---|---|---|
| 2022/0139380 | A1* | 5/2022 | Meng | G06N 3/044 704/232 |
| 2022/0398071 | A1* | 12/2022 | Allamanis | G06N 3/084 |
| 2023/0342116 | A1* | 10/2023 | Dibia | G06F 8/44 |
| 2023/0418567 | A1* | 12/2023 | Athiwaratkun | G06F 8/33 |
| 2024/0020491 | A1* | 1/2024 | Chen | G06F 40/58 |
| 2024/0095077 | A1* | 3/2024 | Singh | G06F 9/5027 |
| 2024/0127112 | A1* | 4/2024 | Ziegler | G06N 20/00 |
| 2024/0143289 | A1* | 5/2024 | Pandita | G06F 8/33 |
| 2024/0143296 | A1* | 5/2024 | Hasabnis | G06F 8/41 |
| 2024/0144922 | A1* | 5/2024 | Pandita | G10L 15/183 |
| 2024/0248686 | A1* | 7/2024 | Garg | G06F 11/3668 |
| 2024/0256423 | A1* | 8/2024 | Zhang | G06F 8/71 |
| 2024/0273294 | A1* | 8/2024 | Shakeri | G06F 40/295 |
| 2024/0281218 | A1* | 8/2024 | Masad | G06F 8/33 |
| 2024/0289606 | A1* | 8/2024 | Wang | G06N 3/08 |
| 2024/0311093 | A1* | 9/2024 | Schaefer | G06F 8/37 |
| 2024/0329948 | A1* | 10/2024 | Yuan | G06F 8/4441 |
| 2024/0361996 | A1* | 10/2024 | Fu | G06F 8/73 |
| 2024/0362209 | A1* | 10/2024 | Almaer | G06F 16/2433 |
| 2024/0378399 | A1* | 11/2024 | Gandhi | G06F 40/40 |
| 2025/0094145 | A1* | 3/2025 | Weber | G06F 8/43 |
| 2025/0094814 | A1* | 3/2025 | Wang | G06N 3/0895 |
| 2025/0103300 | A1* | 3/2025 | Le | G06F 40/40 |
| 2025/0111220 | A1* | 4/2025 | Jones | G06N 3/08 |
| 2025/0117195 | A1* | 4/2025 | Rieken | G06F 8/35 |
| 2025/0123812 | A1* | 4/2025 | Zhao | G06F 8/433 |

OTHER PUBLICATIONS

Husein, Rasha Ahmad, Hala Aburajouh, and Cagatay Catal. "Large language models for code completion: A systematic literature review." Computer Standards & Interfaces 92 (2025).*

Svyatkovskiy, Alexey, et al. "Intellicode compose: Code generation using transformer." Proceedings of the 28th ACM joint meeting on European software engineering conference and symposium on the foundations of software engineering. 2020.*

Bareiß, Patrick, et al. "Code generation tools (almost) for free? a study of few-shot, pre-trained language models on code." arXiv preprint arXiv:2206.01335 (2022).*

Devlin, et al., "BERT: Pre-training of Deep Bidirectional Transformers for Language Understanding", In Proceedings of Conference of the North American Chapter of the Association for Computational Linguistics: Human Language Technologies, Jun. 2, 2019, pp. 4171-4186.

Liu, et al., "ROBERTa: A Robustly Optimized BERT Pretraining Approach", In Repository of arXiv:1907.11692v1, Jul. 26, 2019, 13 Pages.

Sun, et al., "Don't Complete It! Preventing Unhelpful Code Completion for Productive and Sustainable Neural Code Completion Systems", In Proceeding of IEEE/ACM 45th International Conference on Software Engineering: Companion Proceedings, May 14, 2023, pp. 324-325.

Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, pp. 1433-1443.

Vaswani, et al., "Attention Is All You Need", In Proceedings of 31st Conference on Neural Information Processing Systems, Dec. 4, 2017, pp. 1-11.

International Search Report and Written Opinion received for PCT Application No. PCT/US2024/026715, Jul. 15, 2024, 13 pages.

Weiss, et al., "Adopting Two Supervisors for Efficient Use of Large-Scale Remote Deep Neural Networks," arXiv, Apr. 5, 2023, pp. 1-29.

U.S. Appl. No. 63/467,309, May 17, 2023.

International Preliminary Report on Patentability (Chapter I) received for PCT Application No. PCT/US2024/026715, Mailed on Nov. 27, 2025, 09 Pages.

* cited by examiner

HYBRID INFERENCE SYSTEM FOR COGS REDUCTION

CROSS-REFERENCE TO RELATED APPLICATIONS

The present application claims the benefit of the earlier filed provisional application having Ser. No. 63/467,309 filed on May 17, 2023, entitled "Hybrid Inference System Utilizing COGS Reduction," which is incorporated by reference in its entirety.

BACKGROUND

A large language model is a type of machine learning model trained on a massively-large training dataset of text and/or source code resulting in the model containing billions of parameters. The large language model is used to perform various tasks such as natural language processing, text generation, machine translation, and source code generation. The large language model is based on deep learning neural networks such as a neural transformer model with attention.

Often the large language model is hosted on an external web server. There is a cost associated with the usage of the model which may include the web service's fee for access to the model, the network latency incurred in communicating with the external web server and the acceptance rate of the output from the model by its intended recipient. In some scenarios, the cost associated with using the model outweighs the benefits.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hybrid inference system is designed to improve the cost of goods served (COGS) in order to efficiently automate coding assistants powered by a large language model. To reduce the cost associated with the usage of the large language model, the hybrid inference system combines the capabilities of a local generative pre-trained transformer model ("local model") with a large language model hosted on a remote web server. A routing model is used to predict whether the output generated by the large language model is likely to be rejected by a user of the coding assistant or if the local model is likely to generate a comparable output as the large language model for a given prompt. When the routing model predicts that the output generated by the large language model is likely to be rejected by the user, then the inference system utilizes the local model to generate a response to the prompt. When the routing model predicts that the output generated by the large language model is not likely to be rejected by the user, the inference system utilizes the large language model.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
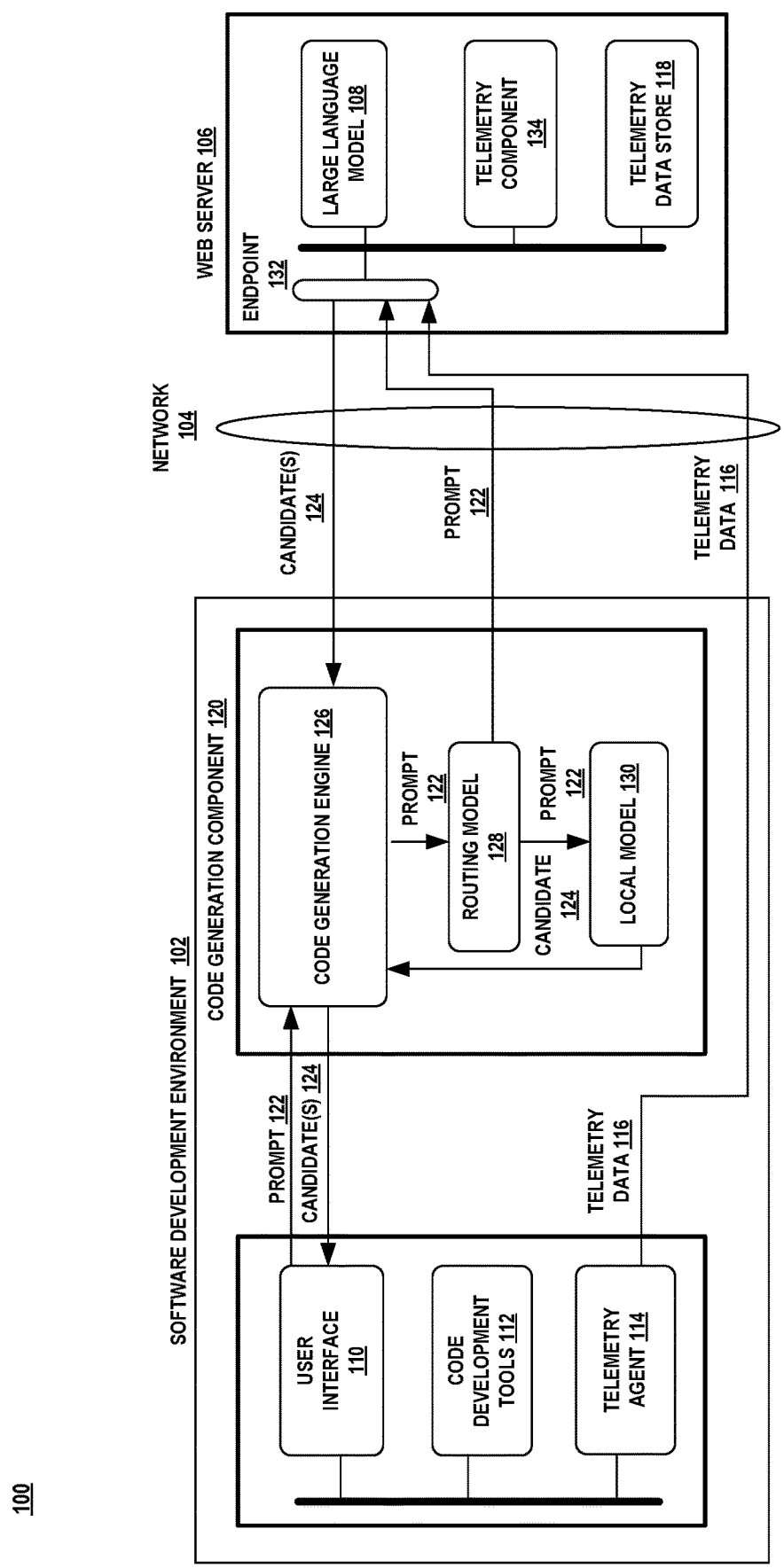
FIG. 1 illustrates an exemplary hybrid inference system for a coding assistant.

A hybrid inference system is designed to improve the cost of goods served (COGS) in order to efficiently automate coding assistants powered by a large language model. The cost of goods served pertains to the cost of the large language model in a coding assistant and includes, without limitation, cloud hosting costs, network latency, and the model's output acceptance rate. To reduce the cost associated with the usage of the large language model, the hybrid inference system combines the capabilities of a local generative pre-trained transformer model ("local model") with a large language model hosted on a remote web server. The local model is hosted on the same computing device as the coding assistant and is a smaller compact model capable of generating acceptable output. The large language model is hosted on a web service external to the computing device hosting the coding assistant.

A routing model is used to predict whether the output generated by the large language model is likely to be rejected by a user and if the local model is likely to generate a comparable output as the large language model for a given prompt. When the routing model predicts that the output generated by the large language model is likely to be rejected by the user, then the inference system utilizes the local model to generate a response to the prompt. When the routing model predicts that the output generated by the large language model is likely to be accepted by the user, the inference system utilizes the large language model.

In an aspect, the hybrid inference system is utilized in a software development environment (e.g., source code editor, Integrated Development Environment (IDE), version-controlled source code repository) to generate code completions, source code translations, test cases, method bodies, method signatures, perform code searches, and other software development tasks. The use of a machine learning model to predict an output within a software development environment needs to be accurate and fast. When the large language model takes an enormous amount of time to produce a prediction or if the prediction is unacceptable to the user, the user tends to become frustrated with the software development environment and may not use it.

In an aspect, the routing model is a neural-based binary classifier. The classifier is equipped to recognize a wide spectrum of prompts with typical low-returns which are rerouted to the local model. The local model can function efficiently on a client device thereby eliminating the cloud hosting costs, and network latency incurred from the use of the large language model. The local model is a smaller model having a smaller number of parameters and model size. In an aspect, the smaller model fits within the memory constraints of user computing devices, such as laptops and workstations, and its maximum capacity is typically 100 million parameters. In addition, the small model is expected to make a prediction within a particular timing constraint. For example, for a code completion task, the local model should decode an entire completion within 100 ms per sequence to prevent any perceptible delay or lag, including on a CPU.

The routing model is pre-trained on natural language text and source code and fine-tuned on the telemetry data of the large language model. The predictions made by the large language model for a given set of prompts are monitored for acceptance by the users of the inference system. The monitored or telemetry data is used to train the routing model to recognize prompts that are likely to generate output from the large language model that will be accepted by a user or low-return prompts that result in an output generated by the large language model that is not accepted by the user.

Attention now turns to a more detailed description of the system, method, device and components of the hybrid inference system.

System

Turning to FIG. 1, there is shown an exemplary hybrid inference system 100. It should be noted that the exemplary hybrid inference system shown in FIG. 1 is software development environment 102 such as an integrated development environment. However, it should be noted that the technique described herein is not limited to a software development environment and is used herein to illustrate the details of the technique contained herein. The technique may be used in a version-controlled code repository, web browser, or other web-based platforms.

The hybrid inference system 100 includes a software development environment 102 communicatively coupled through a network 104 to a web server 106 hosting a large language model 108. The software development environment 102 is hosted on a user's computing device. The software development environment 102 includes a user interface 110, code development tools 112, a telemetry agent 114, and a code generation component 120. The user interface 110 interacts with the user of the computing device to develop, maintain, build, and/or test source code. The software development environment 102 includes code development tools 112, such as a source code editor, compilers, debuggers, and the like. A telemetry agent 114 resides in the user's computing device to monitor the acceptance and rejection of the candidates provided by the large language model. The telemetry agent 114 transmits the acceptance/rejection of each candidate or telemetry data 116 proposed by the large language model 108 to the web server 106 where it is stored in a telemetry data store 118.

The code generation component 120 receives a prompt 122 from the user interface 110 which includes a query for a task to be performed by the large language model. The code generation component 120 returns one or more candidates 124 that respond to the user's prompt. The code generation component 120 includes a code generation engine 126, a routing model 128, and a local model 130. The code generation engine 126 interacts with the user interface 110 and the web server 106 to process the prompt 122 and responding with the one or more candidates 124. The routing model 128 receives the prompt and determines which model will respond to the prompt.

The local model 130 is stored in the user's computing device as part of the software development environment 102. In an aspect, the local model is a neural transformer model with attention configured in an encoder-decoder configuration or a decoder-only configuration. The size of the local model is constrained to the memory or storage requirements of the user's computing device. The size of the local model is determined by the number of parameters which includes the number of neurons in its layers, the number of weights and biases, and the number of embeddings (e.g., token and positional embeddings). As advances in storage technologies increase, the size of the local model that can be stored on the user's computing device increases as well. In an aspect, a typical local model could have 8 transformer decoder layers, with embedding dimension 512, hidden dimension 512, 8 attention heads, and total context length of 768.

The web server 106 hosts the large language model 108, the telemetry component 134 and the telemetry data store 118. The large language model 108 is hosted on a web server 106. The size of the large language model exceeds the size of the local model. All communications with the web server 106 utilize an endpoint 130 of the web server. The endpoint 130 is physical device that connects the web server 106 to the network 104 and accepts the prompts and telemetry data from the network 104 and sends back the candidate 124 to the code completion engine 126.

The telemetry component 134 monitors the acceptance/rejection of the candidates generated by the large language model 108 by the user of the software development environment 102. Upon the user registering with the web server 106, the telemetry agent 114 is provided to the user's device. The telemetry component 134 interacts with the telemetry agent 114 on the user's device as an add-on, plug-in, or feature to the software development environment. The telemetry agent 114 monitors the acceptance/rejection of the candidates by the user and reports these results to the telemetry component 134. The telemetry data 116 is used to configure the thresholds of the prediction probabilities that balance the use of the local model and the large language model.

In an aspect, the large language model 108, the routing model 128, and the local model 130 are each configured as a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention. In an aspect, the large language model 108 and the local model 130 are configured as an encoder-decoder neural transformer model with attention or as a decoder neural transformer model with attention. The encoder-decoder neural transformer model with attention consists of a series of stacked encoder blocks coupled to a series of stacked decoder blocks. The decoder neural transformer model with attention consists only of stacked decoder blocks. In an aspect, the routing model is configured as an encoder neural transformer model with attention.

The large language model is pre-trained on natural language text and source code. The training of a large language model requires a considerable amount of training data and computing resources which makes it impossible for some developers to create their own models. Instead, access to various large language models is offered as a cloud service to developers. Examples of the large language models include conversational pre-trained generative neural transformer models with attention offered by OpenAI (i.e., chat GPT models), Codex CoPilot offered by Microsoft, and other similar models.

In an aspect, the web server 106 and the software development environment 102 of the user's computing device communicate through HyperText Transfer Protocol (HTTP)-based Representational State Transfer (REST) Application Programming Interfaces (API). A REST API or web API is an API that conforms to the REST protocol. In the REST protocol, the web server contains a publicly-exposed endpoint having a defined request and response structure expressed in a JavaScript Object Notation (JSON) format. The user interface or other application in the user's computing device, issues web APIs containing the prompt to the web server to instruct the large language model to perform the intended task.

Figure 2:
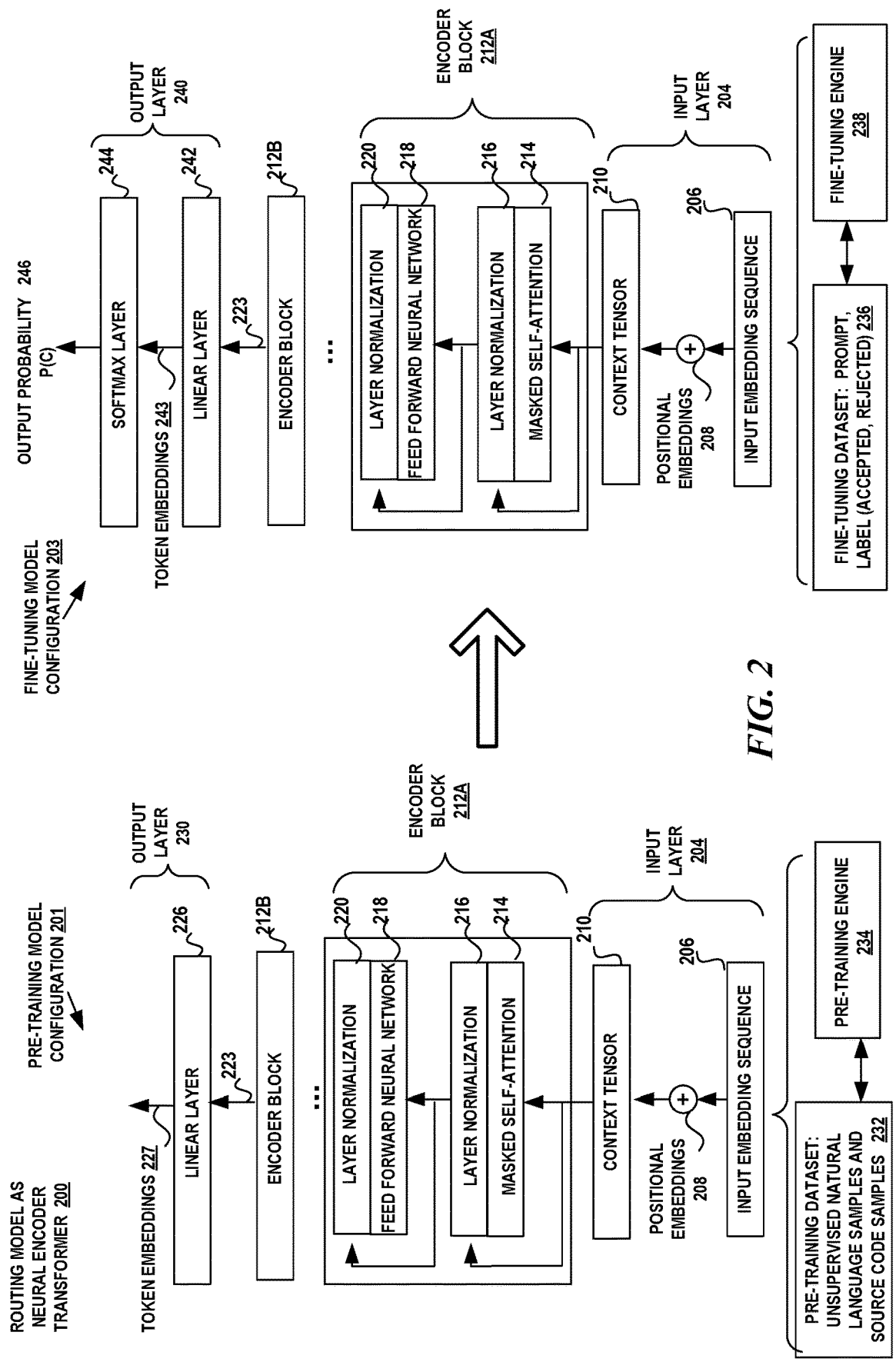
FIG. 2 is a schematic diagram of an exemplary configuration of a routing model as an encoder neural transformer model with attention.

FIG. 2 illustrates an exemplary configuration of the routing model as an encoder neural transformer model with attention. In pre-training 201, the neural encoder transformer model learns to understand source code and natural language text, the relationship between the different code elements and natural language text, and the syntax of a programming language and natural language text. The weights of the model (e.g., token/subtoken embeddings, attention weights (K,V,Q), neural weights and biases) are initialized randomly and changed during pre-training based on the samples in the pre-training dataset 232. The weights of the model are optimized based on reducing a cost function of the neural network layers. A pre-training engine 234 uses the pre-training dataset of unsupervised source code samples and natural language text 232 to pre-train the model for the optimal weights. During fine-tuning 203, the weights computed from the pre-training are used as the initial weights and tuned for the fine-tuning task. A fine-tuning engine 238 uses a fine-tuning dataset 236 composed of prompts and a label that identifies whether the output generated by the large language model in response to the prompt was accepted/rejected by a user.

The neural encoder transformer 201 includes an input layer 204, one or more encoder blocks 212, and an output layer 230. The input layer 204 includes input embeddings of an input sequence of the pre-training dataset 206 and positional embeddings 208 that represent an order of the tokens/subtokens in the input embedding sequence. The input embedding sequence 206 and the positional embeddings 208 are combined to form a context tensor 210.

An encoder block (212A-212B) consists of two layers. The first layer includes a masked self-attention component 214 followed by a layer normalization component 216. The second layer includes a feed-forward neural network 218 followed by a layer normalization component 220. The context tensor 210 is input into the masked self-attention layer 214 of the first encoder block with a residual connection to layer normalization 216. The output of the layer normalization 216 is input to the feed-forward neural network 218 with another residual connection to layer normalization 220. The output of each encoder block (212A-212B) is a set of hidden representations 223. The set of hidden representations 223 is then sent through additional encoder blocks, if multiple encoder blocks exist.

Attention is used to decide which parts of the input sequence are important for each token/subtoken, especially when decoding long sequences since the encoder is limited to encoding a fixed-size vector. Attention mechanisms gather information about the relevant context of a given token/subtoken and then encode that context into a vector which represents the token/subtoken. It is used to identity the relationships between subtokens in the long sequence while ignoring other subtokens that do not have much bearing on a given prediction.

The masked self-attention component 214 takes a context tensor 210 and weighs the relevance of each token/subtoken represented in the context tensor to each other by generating attention weights for each token/subtoken in the input embedding sequence 206. In one aspect, the attention function is scaled dot-product attention which is described mathematically as follows:

$$\text{Attention}(Q, K, V) = \text{SoftMax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token/subtoken in a sequence, K is the vector representations of all tokens/subtokens in the sequence, and V is the vector representations of all the tokens/subtokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O,$$

where $\text{head}_i=\text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural encoder transformer, layer normalization is used between the layers. The layer normalization component normalizes the inputs across the features. The mean and standard deviation is computed across the feature dimensions. There is a first layer normalization 216 that precedes the feed-forward neural network 218 and a second layer normalization 220 that follows the feed-forward neural network 218. The feed-forward neural network 218 processes each output encoding separately. The output of the top encoder block is a set of attention vectors K and V 223 that represent the last hidden layer.

In the pre-training model configuration 201, the output layer includes a linear layer 226 from which the subtoken/token embeddings 227 are output. For fine-tuning, the neural encoder transformer model contains the same structure as the pre-trained model configuration except for the addition of a different output layer 240 that outputs the number of classes for classification. The output layer of the pre-trained model is replaced with a classification layer that learns a new weight matrix of dimension K×H from randomly-initialized values, where K is the number of classes in a downstream classification task and where H is the dimension of the output of last encoder block.

The output layer of the pre-trained model 230 is not used since its weight matrix is of a different size that may not contain the classes of the target classification task. Instead, the new output layer 240 is used which has the number of hidden units set to the number of classes K of the fine-tuning classification task with a softmax activation function 244. The predicted probability P for the j-th class given an output of last encoder block x and weight matrix W corresponding to the classification layer is as follows:

$P(y=j|x) = \exp(x^T W_j + b) / [\Sigma_{k=1 \ldots K} \exp(x^T W_k + b)]$, where K is the number of classes, W is the weight matrix of dimension K×H, H is the dimension of x, the output of last encoder block, and b is the bias value.

The output layer 240 consists of a linear layer 242 and a softmax layer 244. The linear layer 242 is a fully-connected neural network that projects the raw scores output by the last layer of the neural network into a logits vector. The softmax layer 244 applies the softmax function to the logits vector to compute a vector that represents the probability distribution 246 of the class, P(C). In one aspect, there is a single class, C, that represents the output. When the probability of the class meets or exceeds a threshold, then the probability represents that the large language model is likely to be accepted by the user. When the probability of the class does not meet the threshold, then the probability represents that the large language model is not likely to be accepted by the user and the local code model is likely to produce a highly-similar completion to that of the large language model.

It should be noted that other types of classifiers may be used for this task, such as random forests or gradient boosted trees.

Figure 3:
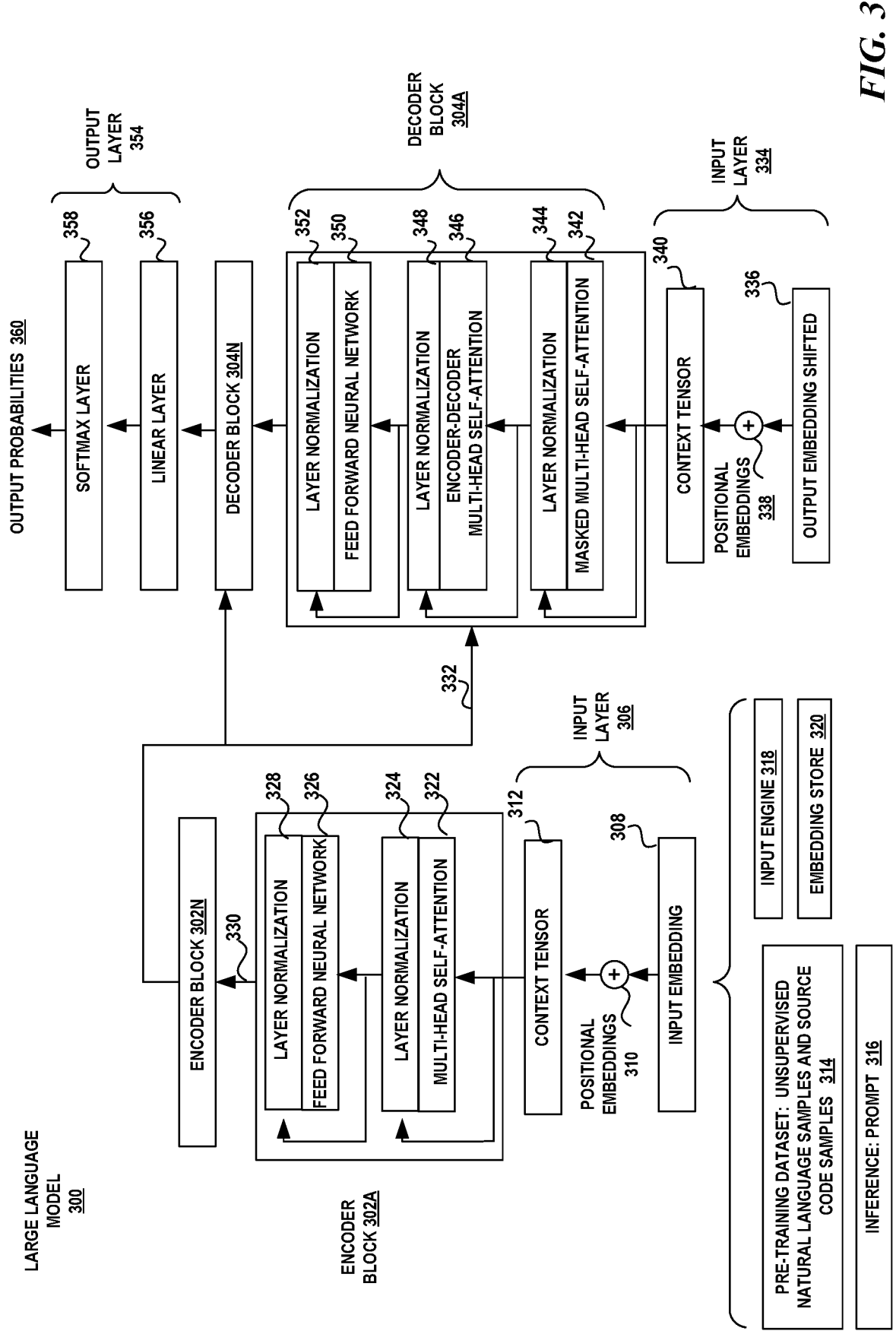
FIG. 3 is a schematic diagram of an exemplary configuration of the large language model as a neural transformer model with attention with encoder and decoder blocks.

FIG. 3 shows an exemplary architecture of the large language model configured with one or more encoder blocks 302A-302N ("302") coupled to one or more decoder blocks 304A-304N ("304").

An input layer 306 provides the initial inputs to the first encoder block 302A which include the input embeddings 308 of an input sequence. In order to retain the order of the tokens in the input sequence, positional embeddings 310 are added to the input embeddings 308 forming a context tensor 312. During training, the input sequence includes a pre-training dataset of token embeddings representing source code samples and natural language text 314 and during inference the input sequence includes token embeddings representing a prompt 316. An input engine 318 transforms the input sequence into a respective input embedding sequence 308 which is applied to the first encoder block 302A.

The embeddings for each token are stored in an embedding store 320. Initially, random values are generated for each token embedding of the model's vocabulary. During the model's training, the embeddings are updated with actual values derived from the computations performed in the various layers of the model.

The encoder block 302 consists of two layers. The first layer includes a multi-head self-attention component 322 followed by layer normalization component 324. The second layer includes a feed-forward neural network 326 followed by a layer normalization component 328. The context tensor 312 is input into the multi-head self-attention layer 322 of the first encoder block 302 with a residual connection to layer normalization 324. The output of the layer normalization 324 is input to the feed-forward neural network 326 with another residual connection to layer normalization 328. The output of the encoder block 302 is a set of hidden representations 330. The set of hidden representations 330 is then sent through additional encoder blocks.

At the last encoder block 302N, the set of hidden representations 332 is sent to the decoder blocks 304A-304N. The encoder blocks operate as described above with respect to FIG. 2. The output of the top encoder block is a set of attention vectors K and V 332 which is used by the encoder-decoder multi-head self-attention layer 346 of each decoder block 304.

The decoder blocks 304 predict each token $t_i$ of the response one-by-one at each time step conditioned on all previously-generated target tokens $t_1, \ldots t_{i-1}$. Initially, the first decoder block receives a START token. Thereafter a shifted sequence of the output embeddings 336 from the previous time step to which the positional embeddings 338 are added forming context tensor 340.

A decoder block 304 consists of three layers. The first layer includes a masked multi-head self-attention component 342 followed by a layer normalization component 344. The output of the layer normalization component 344 is input into the encoder-decoder multi-head self-attention component 346 with a residual connection to layer normalization component 348. The second layer includes an encoder-decoder multi-head self-attention component 346 followed by a layer normalization component 348. The third layer includes a feed-forward neural network 350 followed by a layer normalization component 352. The output of layer normalization component 348 is input into the feed-forward neural network 350 with a residual connection to layer normalization component 352.

The masked multi-head self-attention component 342 receives the output embeddings of the previous timestep. The masked multi-head self-attention component 342 masks the output embeddings from future time steps. The encoder-decoder multi-head self-attention layer 346 receives queries from the previous decoder layer and the memory keys and values 332 from the output of the encoder blocks. In this manner, the decoder block 304 can attend to every position of the input sequence. The feed-forward neural network 350 processes each output encoding separately. A layer normalization component 344, 348, 352 is used between the layers in order to normalizes the inputs across the features.

The output layer 354 includes a linear layer 356 and a softmax layer 358 that generates the output probabilities 360 for each token in the model's vocabulary. The linear layer 356 is a neural network that projects the vector produced by the stack of decoders into a logits vector. The softmax layer 358 then turns the scores of the logits vector into probabilities 360 for each token in the vocabulary which are positive and normalized.

Figure 4:
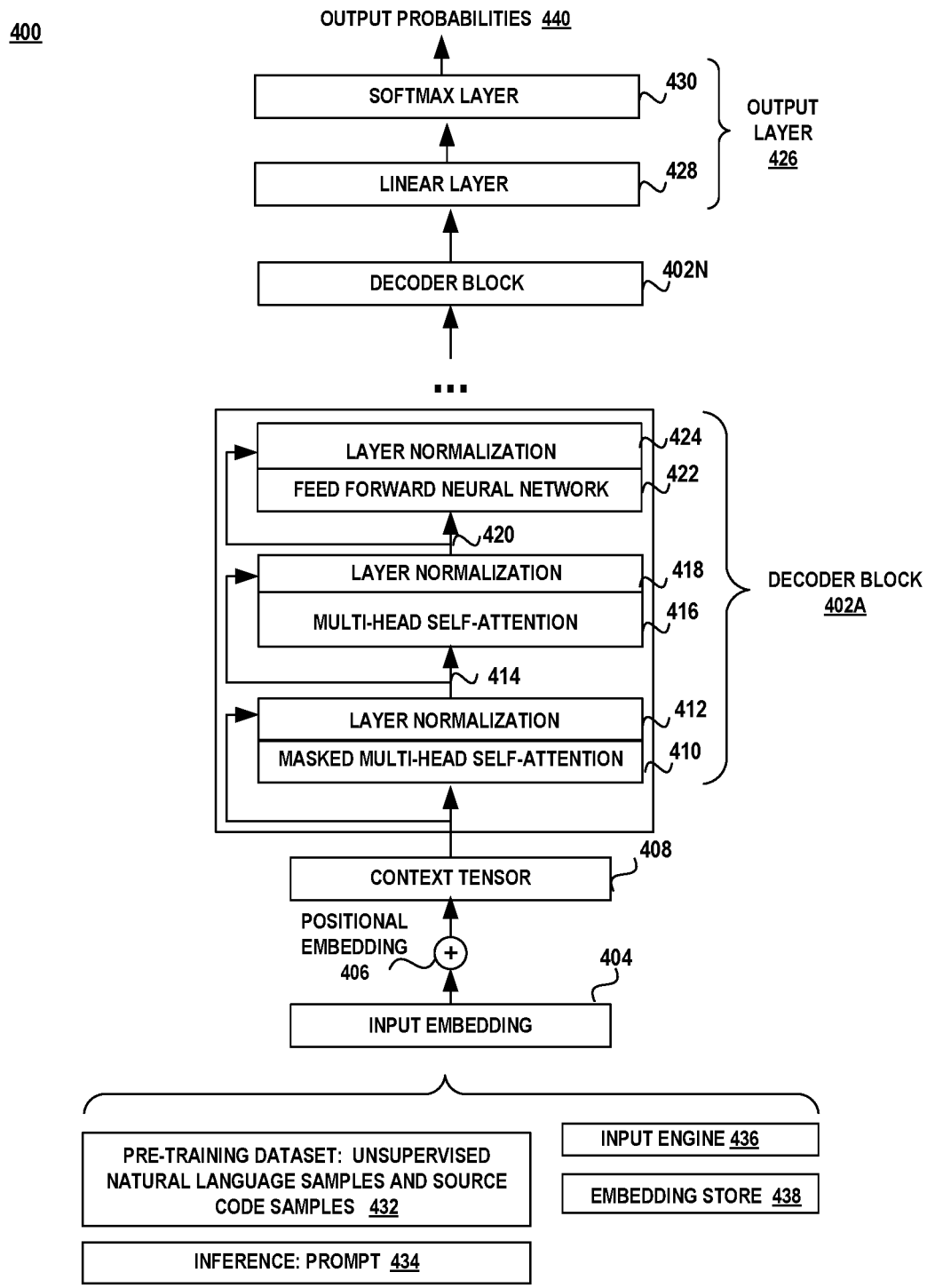
FIG. 4 is a schematic diagram of an exemplary configuration of the local model as a decoder-only neural transformer model with attention.

Turning to FIG. 4, there is shown an exemplary configuration of the local model as a decoder-only neural transformer model with attention. The decoder blocks 402 are stacked so that the output of one decoder block is input into another decoder block. The input to the first decoder block 402A is formed in a context tensor 408 and composed of an input embedding 404 and its positional embedding 406.

A decoder block 402 predicts each subtoken $t_i$ in the target language one-by-one at each time step conditioned on all previously-generated target subtokens $t_1, \ldots t_{i-1}$. A decoder block 402 consists of two layers. The first layer includes a masked multi-head self-attention component 410 followed by a layer normalization component 412. The output of the layer normalization component 414 is input into the feed forward neural network 422 with a residual connection to layer normalization component 424. The third layer includes a feed forward neural network 422 followed by a layer normalization component 424.

The neural transformer model takes the sequence x as the input and then converts the sequence into input vectors $H^0$. For each subtoken, a context tensor is formed from its corresponding subtoken and positional embeddings. The neural transformer model applies N decoder blocks over the context tensor to produce a contextual representation, $H^n = \text{decoder}_n(H^{n-1})$, n∈1, N|. Each decoder block 402 applies a multi-headed self-attention operation followed by a feed forward layer over the input $H^{n-1}$ in the n-th layer. At the n-th decoder block, the output $H^n$ of the multi-headed self-attention component is computed as:

$$Q_i = H^{n-1} W_i^Q, K_i = H^{n-1} W_i^K, V_i = H^{n-1} W_i^V,$$

$$\text{head}_i = \text{softmax}\left((Q_i K_i^T)/\sqrt{d_k} + M\right) V_i$$

$$H^n = [\text{head}_1; \ldots; \text{head}_n] W_n^O$$

where the previous layer's output $H^{n-1} \in \mathbb{R}^{|X| \times dh}$ is linearly projected to a triplet of queries (Q), keys (K), and values (V) using model parameters $W_i^Q$, $W_i^K$, $W_i^V \in \mathbb{R}^{dh \times dk}$, respectively, where u is the number of heads, $d_k$ is the dimension of a head, and $W_n^O \in \mathbb{R}^{dh \times dh}$ is the model parameters, $M \in \mathbb{R}^{|X| \times |X|}$ is a mask matrix, where $M_{ij}$ is 0 if i-th token is allowed to attend j-th token, otherwise −∞.

The masked multi-head self-attention component 410 receives the input embeddings as key (K), value (V) and query (Q) inputs. The output of the self-attention layer 410 is a weighted sum of the values, where each weight is computed as a compatibility score of a query given the corresponding key. The masked multi-head self-attention component 410 uses a causal mask, forbidding input embedding i to attend to an input embedding j having j>i, i.e., from the future. Each self-attention head 416A, 416B performs the scaled dot-product attention operation: Attention (Q,K, V)=softmax $(Q^*K^T/\sqrt{d_k})^*V$, where $d_k$ is the dimension of the keys and queries.

In one aspect of the disclosure, the masked multi-head self-attention layer 410 consists of multiple attention heads, such as 416A, 416B. The self-attention heads run through the scaled dot product attention, Attention (Q,K,V), multiple times in parallel. Each attention head 416A, 416B operates on a portion of the context tensor 408. Attention head 416A operates on a first segment 418A and attention head 416B operates on a second segment 418B. Each attention head 416A, 416B operates on an input sequence $x=(x_1, \ldots, x_n)$ of n elements and computes a new sequence of the same length $z=(z_1, \ldots, z_n)$. Each output element $z_i$ is computed as a weighted sum of linearly transformed input elements:

$$z_i = \sum_{j=1}^{n} \alpha_{ij} (x_j W^V).$$

Each weight coefficient is computed using the softmax function as follows:

$$\alpha_{ij} = \frac{\exp e_{ij}}{\sum_{k=1}^{n} \exp e_{ik}},$$

where $e_{ij}$ is the scaled dot product $$e_{ij} = \frac{(x_i W^Q)(x_j W^K)^T}{\sqrt{d_z}},$$

where $d_z$ is the dimension of z.

A layer normalization component 412, 418, 424 is used between the layers in order to normalize the inputs across the features. The training of a neural network is a time-consuming task and layer normalization is used to reduce the training time by normalizing the inputs across the features.

Each token/subtoken flows through all the decoder blocks 402 along its own path. The decoder block 402 predicts each subtoken $t_i$ in the target language one-by-one at each time step conditioned on all previously-generated target subtokens $t_1, \ldots t_{i-1}$.

It should be noted that the large language model may be configured as a decoder-only neural transformer model with attention and that the local model may be configured in an encoder-decoder configuration shown in FIG. 3.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
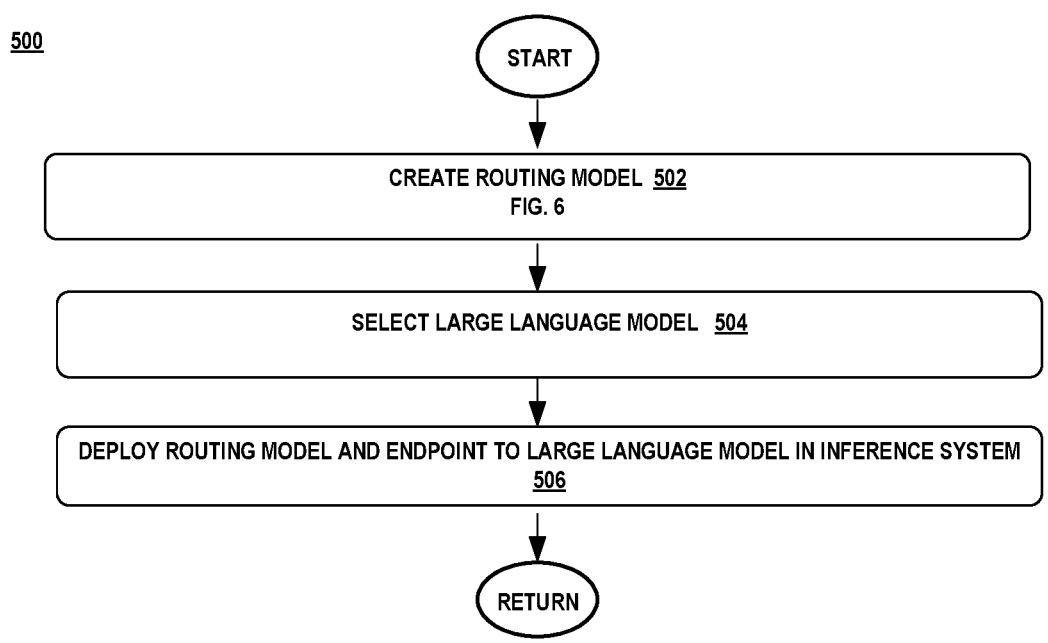
FIG. 5 is a flow chart illustrating an exemplary method of the hybrid inference system.

Turning to FIG. 5, there is shown an exemplary method 500 of the hybrid inference system. Initially, the routing model is generated (block 502) and a large language model is selected for the particular inference task (block 504). The endpoint of the selected large language model and the routing model are then deployed in an inference system (block 506).

Figure 6:
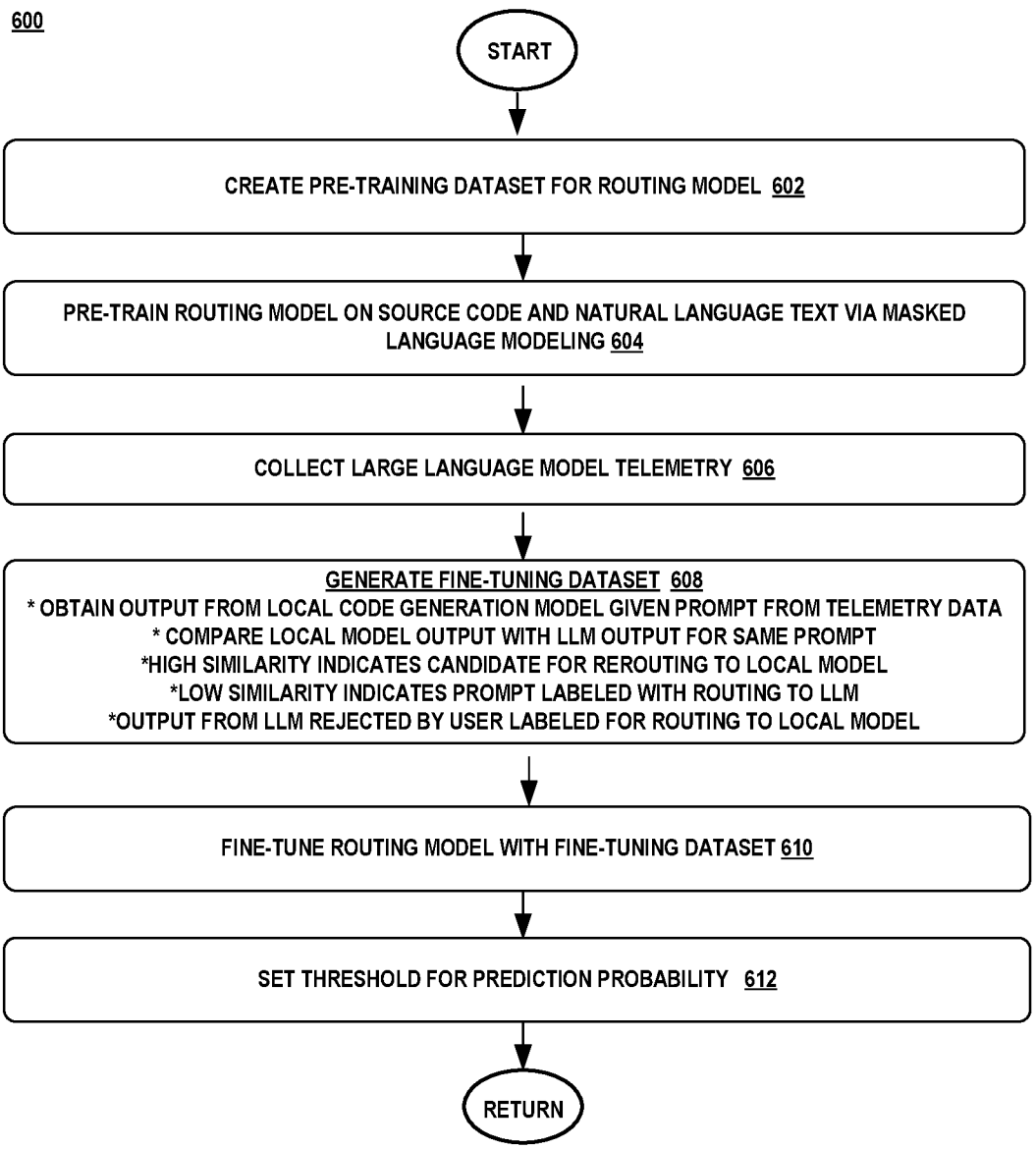
FIG. 6 is a flow chart illustrating an exemplary method for creating the routing model.

FIG. 6 shows an exemplary method 600 for training the routing model. Pre-training is the process where the model's parameters (e.g., embeddings, weights, biases) are learned from unsupervised data. The model learns the parameters through the optimization of the cost function used by the neural network layer of the model. The cost function determines the error loss from the previous epoch which is then backpropagated to the preceding layers of the model. The model's parameters are updated through backpropagation based on the error loss determined by the cost function.

Fine-tuning is the process where the model's parameters generated by the pre-training are updated from supervised data. The optimization of the cost function used in the neural network layer of the model determines the error loss from the previous epoch which is then backpropagated to the preceding layers of the model. The model's parameters are updated through backpropagation based on the error loss determined by the cost function. Once the model is fully trained, the model's embeddings are stored in a separate data structure, the embedding store, and used in the inference process to transform an input sequence of tokens into a sequence of input embeddings. Each token in an input sequence is converted into its corresponding embedding resulting in the sequence of input embeddings that is applied to the model.

Each of the pre-training samples of a pre-training dataset is an input sequence that is transformed into a sequence of input embeddings. The input sequence is tokenized and each token in replaced with a respective embedding transforming the input sequence into a sequence of input embeddings. An embedding is a learned representation for the text-based tokens where tokens that have a common meaning have a common representation. An embedding is a mapping of discrete categorical variables to a vector of continuous numbers. There is an embedding for each token of the source code and natural language text of the code reviews used in the pre-training and fine-tuning datasets. Each token embedding has a corresponding positional embedding. The neural transformer model does not read each token sequentially and as such, has no knowledge of the token's position in a sequence without additional position information. The positional embedding is used to encode position information about a token's position in a sequence into the neural transformer model.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

The neural transformer model has multiple blocks and layers so that more detailed relationships within the data is learned as well as how the features interact with each other on a non-linear level.

For each input sequence of each batch in each epoch, the T-ordered sequences of tokens are then mapped into numeric vectors and then into respective token embeddings and positional embeddings. Initial values are generated for the token embedding and positional embeddings of each input sequence which are then used to form a context tensor.

Thereafter, the neural transformer model learns the values for each embedding through backpropagation. Upon the completion of the training phase, the embeddings for each token and the positional embeddings are saved into respective matrices for later use. There is a token embedding matrix, We, that contains an embedding vector for each token $t_i$, i=0 ... V of a particular programming language, and a positional embedding matrix, $W_p$, that contains an embedding vector $P_j$, j=0 ... T, for each position, where V is the size of the vocabulary for a particular programming language and T is the length of the token sequence.

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights.

At the completion of each batch, the parameters of the neural transformer model are updated at a preconfigured frequency. The parameters include the weights, biases, token embeddings and the positional embeddings which are stored in a respective embedding matrix.

The fine-tuning process starts out with the parameters generated from the pre-training which are updated based on the model calculations made from the fine-tuning dataset. The fine-tuning dataset is used instead of the pre-training dataset.

Turning to FIG. 6, there is shown an exemplary method for training the routing model 600. A pre-training dataset is generated for the routing model (block 602). The routing model is pre-trained on source code samples and natural language text to learn to understand the relationship between the source code elements in a source code snippet and the relationship between the words in a natural language. The source code and natural language samples are extracted from publicly-accessible source code repositories and natural language libraries, repositories, and the like.

The routing model is pre-trained on the pre-training dataset using a masked language modeling objective (block 604). In a masked language modeling objective, the model is trained to predict missing tokens in an input sequence based on the context surrounding the missing tokens.

The large language model telemetry data is collected and stored in the telemetry data store (block 606). The telemetry agent on the user's computing device obtains the telemetry data which is sent back to the web server. In an aspect, the telemetry data may include the following information:
  prompt prefix: prompt sent to the large language model;
  generated code: top-1 code predicted by the large language model;
  accepted: indicates whether the user accepted or rejected the code predicted by the large language model;

captured_code: code used by the developer—this is the actual code used by the developer which includes edits made to the predicted code given to the developer, developer-generated code, or the predicted code.

Additional telemetry data may be collected for a particular task. For example, for code completion, the source code following a completion point may be included in the telemetry data.

The fine-tuning dataset for the routing model is generated (block 608). The telemetry data includes each prompt given to the large language model. The prompts are given to the local model to generate an output. The predicted output from the large language model is compared with the predicted output from the local model for each prompt. When there is a high similarity between the predicted output from the large language model and the predicted output from the local model, then the prompt is associated with a label indicating routing to the local model. Prompts having been rejected by the user are associated with a label indicating routing to the local model. When there is no similarity or a low similarity between the predicted output from the large language model and the predicted output from the local model, the label associated with the prompt indicates to route to the large language model.

The routing model is then fine-tuned with the fine-tuning dataset (block 610). The fine-tuning dataset includes a previously-generated prompt given to the large language model and a label indicating routing to the large language model or routing to the local model.

A threshold is generated which is used to interpret the prediction probability output by the routing model (block 612). The model predicts a vector of two components: probability of the positive class and the probability of a negative class. The threshold is applied to the probability of the positive class. The positive class is defined in advance which is either re-route to the local model or route to the large language model.

The threshold is set to minimize false positives and to effectively balance the use of the local model and the large language models to reduce COGS, latency and the optimize the acceptance rate. To minimize false positives, the precision of the model is maximized as follows: Precision=True Positives/(True Positive+False Positives). The COGS savings is directly proportional to the traffic re-routed to the small model with is equal to the true positive rate or recall of the routing model. The threshold that is selected results in the highest recall with a precision above of at least 95%.

Figure 7:
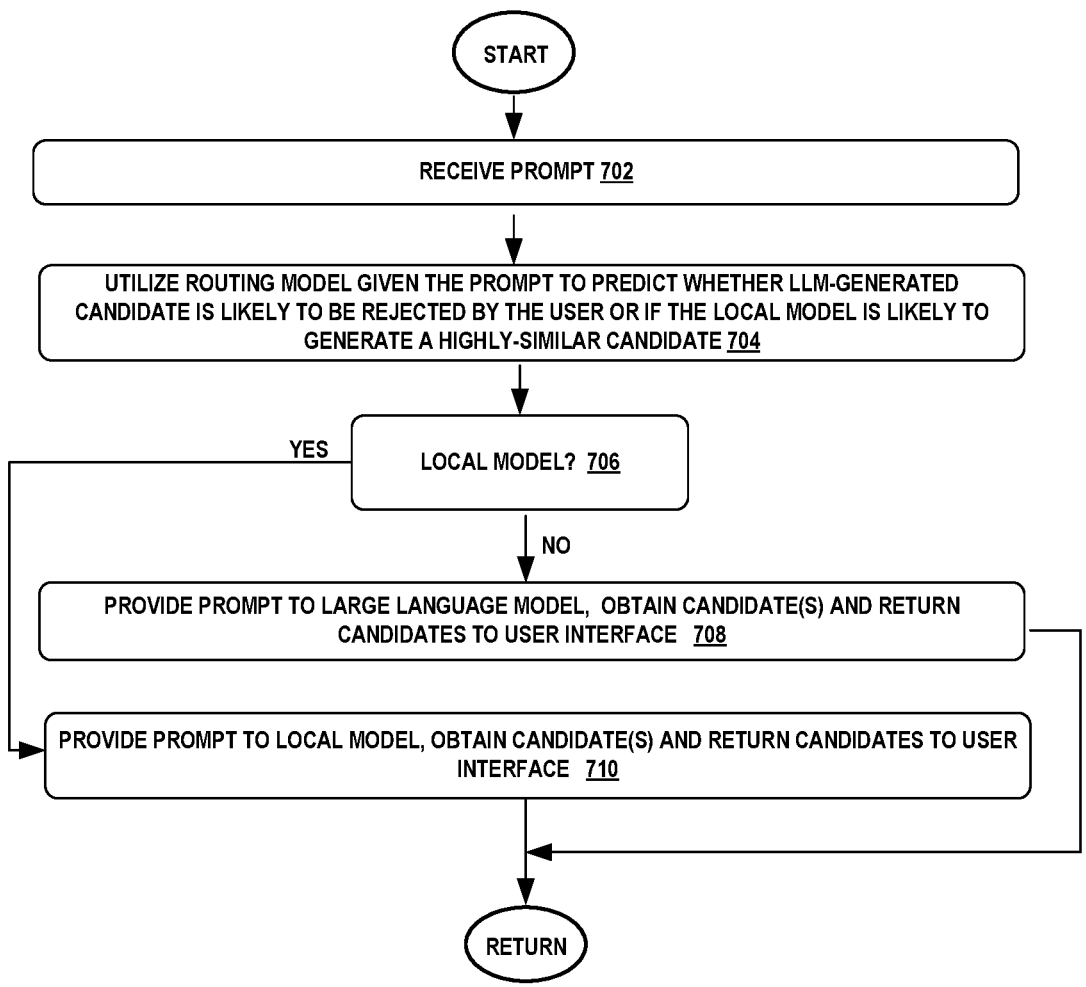
FIG. 7 is a flow chart illustrating an exemplary method for generating code utilizing the hybrid inference system.

FIG. 7 is an exemplary method 700 of the inference process of the hybrid inference system. The code generation engine receives a prompt (block 702). The code generation engine forwards the prompt to the routing model to determine which model receives the prompt (block 704). The code generation engine transforms the prompt into a sequence of input embeddings that is applied to the routing model (block 704). The routing model outputs a probability that is interpreted to indicate the local model or the large language model (block 704).

When the local model is predicted as producing a highly-similar output as the large language model or the candidate predicted by the large language model is likely not to be accepted (block 706—yes), then the prompt is transmitted to the local model. The local model generates one or more candidates given the prompt which are then returned to the user interface.

When the candidate generated by the large language model is predicted to be accepted by the user given the prompt (block 706—no), then the prompt is sent to the large language model (block 710). The large language model may generate one or more candidates which are returned to the user interface (block 710).

Exemplary Operating Environment

Figure 8:
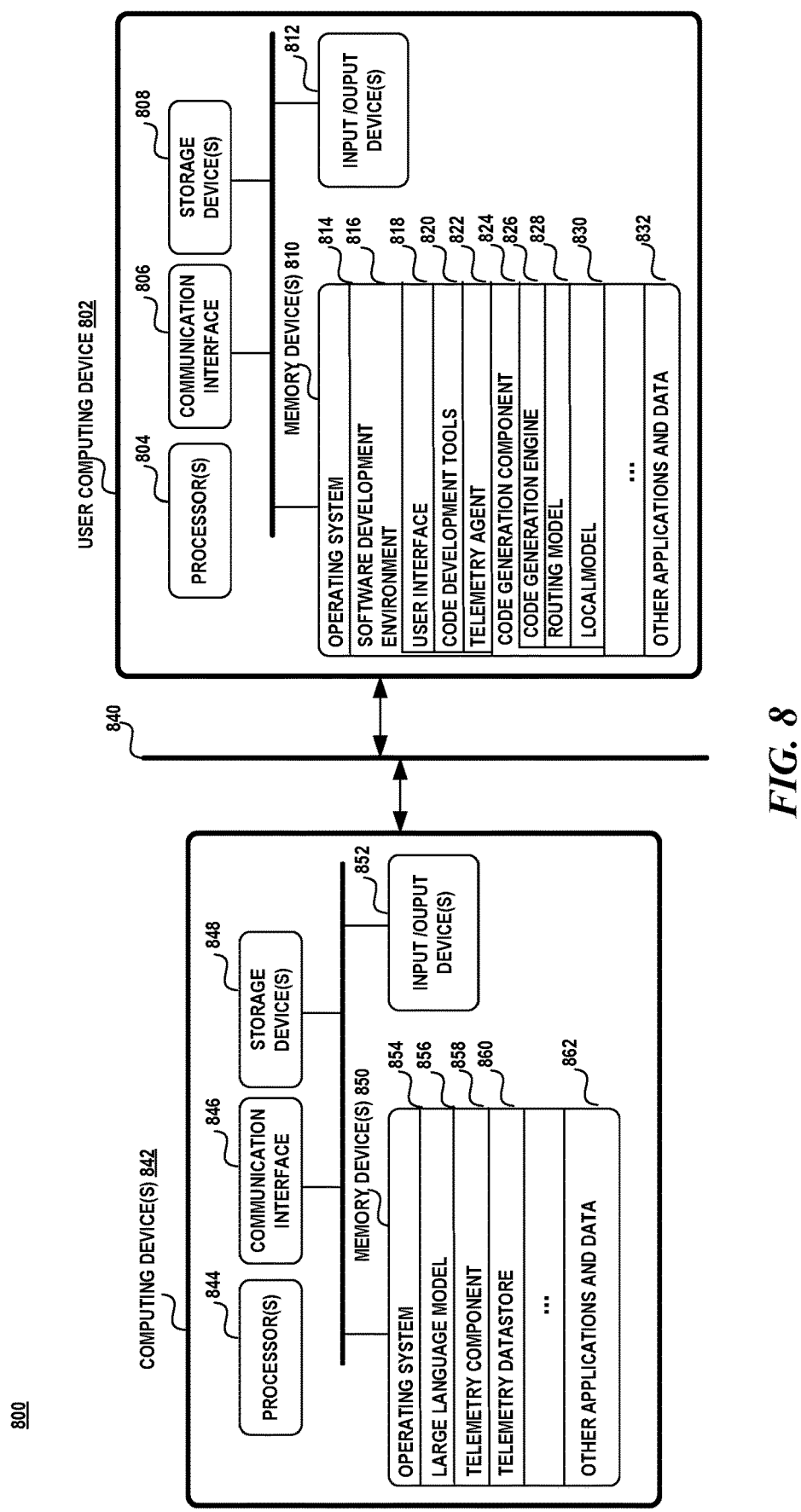
FIG. 8 is a block diagram illustrating an exemplary operating environment.

Attention now turns to a discussion of an exemplary operating environment. FIG. 8 illustrates an exemplary operating environment 800 in which a user computing device 802 is communicatively coupled through a network 840 to one or more computing devices 842 hosting the large language model.

A computing device 802, 842 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

A computing device 802, 842 may include one or more processors 804, 844, one or more communication interfaces 806, 846, one or more storage devices 808, 848, one or more input/output devices 812, 852, and one or more memory devices 810, 850. A processor 804, 844 may be any commercially available or customized processor and may include dual microprocessors and multi-processor architectures. A communication interface 806, 846 facilitates wired or wireless communications between the computing device 802, 804 and other devices. A storage device 808, 848 may be a computer-readable medium that does not contain propagating signals, such as modulated data signals transmitted through a carrier wave. Examples of a storage device 808, 848 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 808, 848 in a computing device 802, 804. The input/output devices 812, 852 may include a keyboard, mouse, pen, voice input device, touch input device, display, speakers, printers, etc., and any combination thereof.

A memory device or memory 810, 850 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 810, 850 may also include one or more external storage devices or remotely located storage devices that do not pertain to propagated signals, such as modulated data signals transmitted through a carrier wave.

The memory device 810, 850 may contain instructions, components, and data. A component is a software program that performs a specific function and is otherwise known as a module, program, component, and/or application. Memory device 810 includes an operating system 814, a software development environment 816 including a user interface 818, code development tools 820, and a telemetry agent 822, a code generation component 824 including a code generation engine 826, a routing model 828, and a local model 830, and other applications and data 832. Memory device 850 includes an operating system 854, a large language model 856, a telemetry component 858, a telemetry data store 860, and other applications and data 862.

A computing device 802, 842 may be communicatively coupled via a network 840. The network 840 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 840 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of minimizing the cost reducing the cost of the usage of a large language model in a coding assistant. The technical feature associated with addressing this problem is the routing model which predicts which model to use. The technical effect is a reduction of the latency time of the coding assistant and an improvement in the acceptance rate of the candidates generated by the inference system. This technical effect improves the input to the user interface of the computing device since it reduces the number of prompts that need to be issued to obtain an acceptable response.

One of ordinary skill in the art understands that the technical effects are the purpose of a technical embodiment. Operations used to train the routing and local models, generate the telemetry data, and the usage of the routing model, local model, and large language model are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments, or in testing labs for production environments as opposed to being mere thought experiments. In an aspect, the technique described herein is utilized in a coding assistant that operates in a production environment, such as a software development environment or other applications that require quick responses to complex queries that cannot be performed by the human mind.

Conclusion

A system is disclosed comprising: a processor; and a memory that stores a program configured to be executed by the processor. The program comprises instructions that when executed by the processor perform acts that: obtain, from a user interface of a coding assistant, a prompt to a large language model (LLM) for a code generation candidate, wherein the LLM resides on an external host; determine whether the code generation candidate generated by the LLM given the prompt is likely to be accepted in the coding assistant; upon determining that the code generation candidate is not likely to be accepted in the coding assistant, route the prompt to a local model in close proximity to the coding assistant; receive the code generation candidate from the local model; and return the code generation candidate to the user interface.

In an aspect, the program includes further instructions that when executed by the processor performs acts that: upon determining that the code generation candidate is likely to be accepted in the coding assistant, route the prompt to the LLM.

In an aspect, the program includes further instructions that when executed by the processor performs acts that: receive the code generation candidate from the LLM; and return the code generation candidate to the user interface.

In an aspect, the program includes further instructions that when executed by the processor performs acts that: utilize a deep learning model to determine whether the code generation candidate generated by the LLM given the prompt is likely to be accepted in the coding assistant. In an aspect, the deep learning model is trained on historical data comprising output generated by the LLM for a respective prompt and acceptance/rejection of the output by a respective user of the coding assistant. In an aspect, the deep learning model comprises an encoder neural transformer model with attention. In an aspect, the local model is a neural transformer model with attention. In an aspect, the large language model is a neural transformer model with attention.

A computer-implemented method is disclose, comprising: receiving, from a user interface of a coding assistant, a prompt to a large language model (LLM), wherein the LLM resides on an external host, wherein the prompt comprises a context for generation of a code generation candidate; determining whether a code generation candidate generated by the LLM given the prompt is likely to be accepted in the coding assistant; upon determining that the code generation candidate generated by the LLM for the given prompt is not likely to be accepted in the coding assistant, routing the prompt to a local model of the coding assistant; receiving the code generation candidate from the local model; and returning the code generation candidate to the user interface.

In an aspect, the method further comprises upon determining that the code generation candidate is likely to be accepted in the coding assistant, routing the prompt to the LLM. In an aspect, the method further comprises: receiving the code generation candidate from the LLM; and returning the code generation candidate to the user interface. In an aspect, the method further comprises: applying the prompt to a deep learning model, wherein the deep learning model predicts whether the code generation candidate generated by the LLM given the prompt is likely to be accepted in the coding assistant.

In an aspect, the deep learning model is trained on historical acceptance of candidates output from the large language model. In an aspect, the deep learning model is trained on historical rejections of candidates output from the large language model. In an aspect, the deep learning model is an encoder neural transformer model with attention.

A hardware device is disclosed having stored thereon computer executable instructions that are structured to be executable by a processor of a computing device to thereby cause the computing device to perform actions that: host a local model on the computing device to interact with a coding assistant to generate an output given a prompt; access a large language model to generate an output given a prompt; obtain a target prompt from a user interface of the coding assistant; predict whether output from the large language model given the target prompt is likely to be accepted by a user of the coding assistant, wherein the prediction is based on historical acceptances and rejections of historical output generated by the large language model given different prompts; upon the prediction indicating that the output from the large language model given the target prompt is likely to be accepted by the user of the coding assistant, route the prompt to the large language model; obtain a response from the large language model; and display the response in the user interface.

In an aspect, the hardware device has stored thereon computer executable instructions that are structured to be executable by a processor of a computing device to thereby cause the computing device to perform actions that: upon the prediction indicating that the output from the large language model given the target prompt is likely to be rejected by the user of the coding assistant, route the prompt to the local model.

In an aspect, the hardware device has stored thereon computer executable instructions that are structured to be executable by a processor of a computing device to thereby cause the computing device to perform actions that: utilize a binary classifier to predict whether the output from the large language model given the target prompt is likely to be accepted by the user of the coding assistant.

In an aspect, the portion of the Public Switched Telephone Network (PSTN) binary classifier resides on the computing device of the coding assistant. In an aspect, the binary classifier is a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
   a processor; and
   a memory that stores a program configured to be executed by the processor, the program comprising instructions that when executed by the processor perform acts that:
   obtain, from a user interface of a coding assistant, a prompt to a large language model (LLM) for the LLM to generate a code generation candidate, wherein the LLM resides on an external host;
   determine, from a routing model, whether the LLM will generate a low-return output not accepted by a user;
   upon the routing model determining that the LLM will generate the low-return output: route the prompt to a local model in proximity to the coding assistant;
   receive the code generation candidate from the local model; and
   return the code generation candidate to the user interface; and
   upon the routing model determining that the LLM will not generate the low-return output:
   route the prompt to the LLM;
   receive the code generation candidate from the LLM; and
   return the code generation candidate to the user interface.

2. The system of claim 1, wherein the local model is stored in a computing device of the coding assistant.

3. The system of claim 1, wherein the routing model is stored in a computing device of a user of the coding assistant.

4. The system of claim 1, wherein the user interface is part of a software development environment.

5. The system of claim 1, wherein the routing model is trained on historical data comprising output generated by the LLM for a respective prompt and acceptance/rejection of the output by a respective user of the coding assistant.

6. The system of claim 1, wherein the routing model comprises an encoder neural transformer model with attention.

7. The system of claim 1, wherein the local model is a neural transformer model with attention.

8. The system of claim 1, wherein the large language model is a neural transformer model with attention.

9. A computer-implemented method, comprising:
   receiving, from a user interface of a coding assistant, a prompt to a large language model (LLM), wherein the LLM resides on an external host, wherein the prompt comprises a context for generation of a code generation candidate;
   determining, from a routing model, whether the prompt is a low-return prompt that will result in the code generation candidate not accepted by a user of the coding assistant;
   upon the routing model determining that the prompt is a low-return prompt: routing the prompt to a local model in proximity of the coding assistant;
   causing the local model to generate the code generation candidate given the prompt;
   receiving the code generation candidate from the local model; and
   returning the code generation candidate to the user interface; and
   upon determining that the prompt is not a low-return prompt: routing the prompt to the LLM.

10. The computer-implemented method of claim 9, wherein the local model is a neural transformer model with attention.

11. The computer-implemented method of claim 9, further comprising:
   receiving the code generation candidate from the LLM; and returning the code generation candidate to the user interface.

12. The computer-implemented method of claim 9, wherein the routing model is trained on telemetry data of the LLM, wherein the telemetry data comprises a plurality of training prompts and associated user responses to output of the LLM given a training prompt.

13. The computer-implemented method of claim 9, wherein the routing model is trained on historical acceptance of candidates output from the large language model.

14. The computer-implemented method of claim 9, wherein the routing model is trained on historical rejections of candidates output from the large language model.

15. The computer-implemented method of claim 9, wherein the routing model is an encoder neural transformer model with attention.

16. A hardware device having stored thereon computer executable instructions that are structured to be executable by a processor of a computing device to thereby cause the computing device to perform actions that:
    host a local neural model on the computing device to interact with a coding assistant;
    access a large language model to generate an output given a prompt;
    obtain a target prompt from a user interface of the coding assistant;
    determine from a routing model whether a target output from the large language model given the target prompt has a high probability of being accepted by a user of the coding assistant, wherein the determination is based on historical acceptances and rejections of historical outputs generated by the large language model given different prompts;
    upon the routing model indicating that the target output from the large language model given the target prompt has a high probability of being accepted by the user of the coding assistant:
    route the prompt to the large language model;
    obtain a response from the large language model; and
    display the response in the user interface; and
    upon the routing model indicating that the target output from the large language model given the target prompt does not have a high probability of being accepted by the user of the coding assistant, route the target prompt to the local neural model.

17. The hardware device of claim 16, wherein the routing model is pre-trained on natural language text and source code and fine-tuned on telemetry data of the large language model.

18. The hardware device of claim 16 having stored thereon computer executable instructions that are structured to be executable by a processor of a computing device to thereby cause the computing device to perform actions that:
    utilize a binary classifier as the routing model to determine to predict whether the output from the large language model given the target prompt is likely to be has a high probability of being accepted by the user of the coding assistant.

19. The hardware device of claim 16, wherein the binary classifier resides on the computing device of the coding assistant.

20. The hardware device of claim 16, wherein the binary classifier is a neural transformer model with attention.

* * * * *